United States Patent [19]

Hama et al.

[11] 4,357,639

[45] Nov. 2, 1982

[54] MAGNETIC TAPE LOADING APPARATUS

[75] Inventors: Hideki Hama, Tokyo; Yoichi Hishijima, Kanagawa, both of Japan

[73] Assignee: Sony Corporation, Tokyo, Japan

[21] Appl. No.: 156,412

[22] Filed: Jun. 4, 1980

[30] Foreign Application Priority Data

Jun. 6, 1979 [JP] Japan .................................. 54/69966
Jun. 19, 1979 [JP] Japan .................................. 54-76326

[51] Int. Cl.³ .......................... G11B 15/66; G11B 5/52
[52] U.S. Cl. ........................................ 360/85; 360/95
[58] Field of Search ................................... 360/85, 95

[56] References Cited

U.S. PATENT DOCUMENTS

| | | | |
|---|---|---|---|
| 3,784,761 | 1/1974 | Moritan et al. | 360/85 |
| 3,825,944 | 7/1974 | Terao et al. | 360/85 |
| 3,864,742 | 2/1975 | Katoh | 360/85 |
| 3,871,025 | 3/1975 | Nakamoto | 360/95 |
| 3,911,491 | 10/1975 | Terao | 360/85 |
| 4,075,670 | 2/1978 | Namoto et al. | 360/95 |

*Primary Examiner*—Alfred H. Eddleman
*Attorney, Agent, or Firm*—Lewis H. Eslinger; Alvin Sinderbrand

[57] ABSTRACT

In a magnetic recording and/or reproducing apparatus of the type having a cylindrical tape guide drum with at least one rotary magnetic head adapted to move in a circular path substantially coinciding with the outer circumferential surface of said drum and a tape cassette holder positioned in front of the guide drum for receiving a tape cassette containing a magnetic tape, an automatic tape loading and unloading device for wrapping a portion of the tape about the guide drum includes a rotatable support ring extending around the guide drum and being rotatable in a plane that is inclined with respect to a plane passing through the tape in the tape cassette; a tape drawing mechanism for withdrawing a loop of tape from the cassette to a predetermined position adjacent the guide drum; a first tape guiding assembly adapted to ride along an arcuate guide rail surrounding a first portion of the outer circumferential surface of the guide drum and actuable by a guide pin on the support ring for wrapping the loop of tape about the first portion of the outer circumferential surface of the tape guide drum as the support ring rotates thereabout; and a second tape guiding assembly including a tape engaging pin mounted on the support ring for successively wrapping the loop of tape about a contiguous second portion of the outer circumferential surface of said tape guide drum upon completion of operation of the first tape guiding assembly.

16 Claims, 15 Drawing Figures

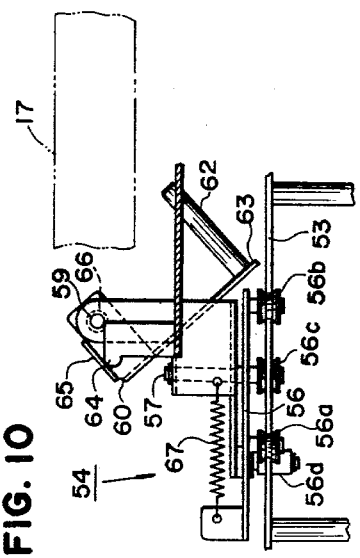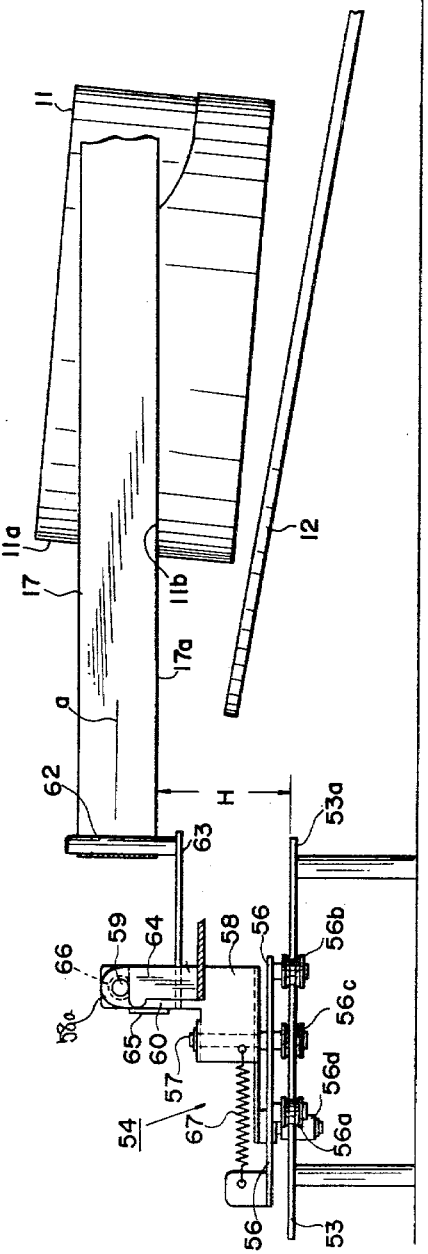

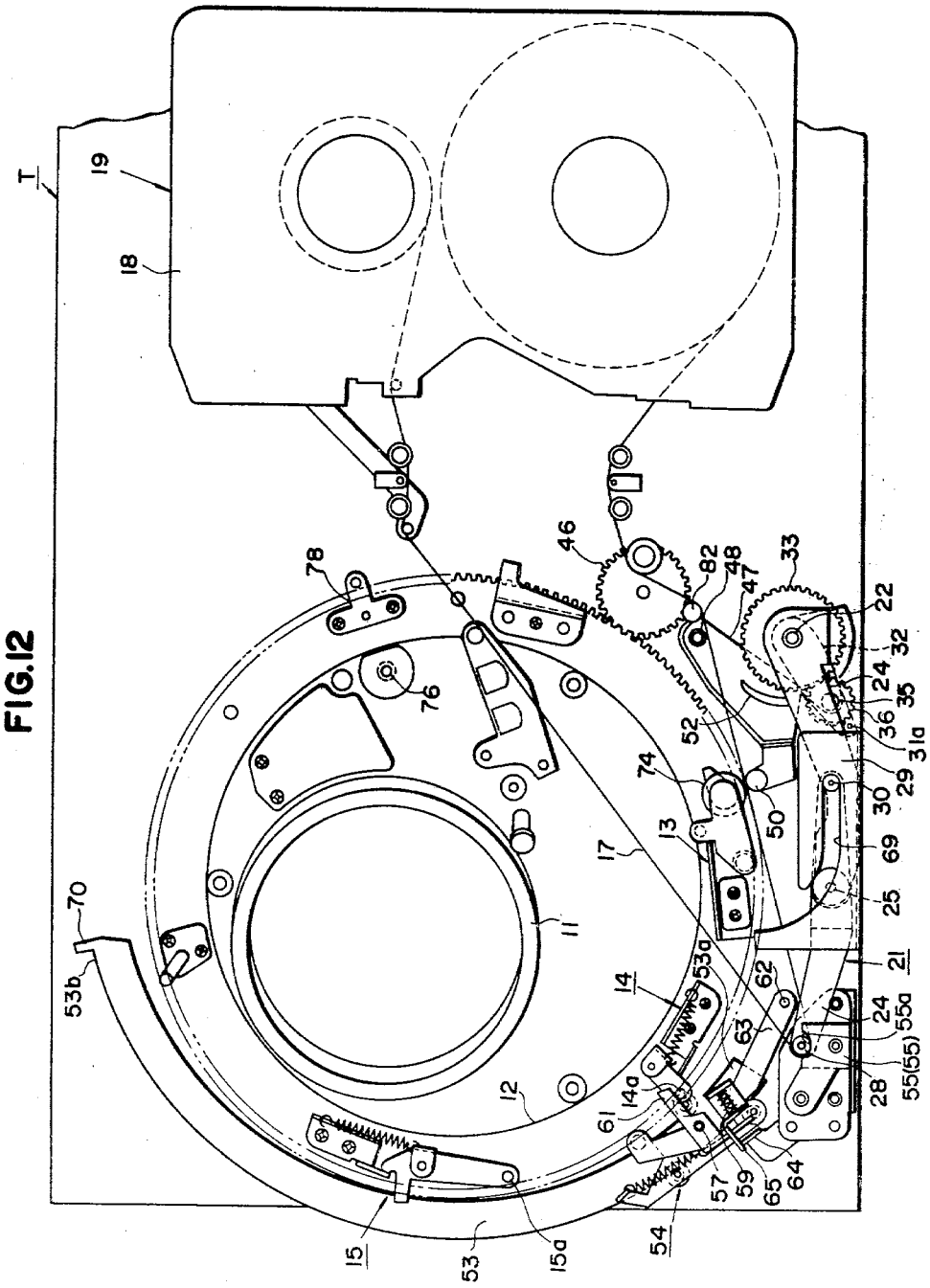

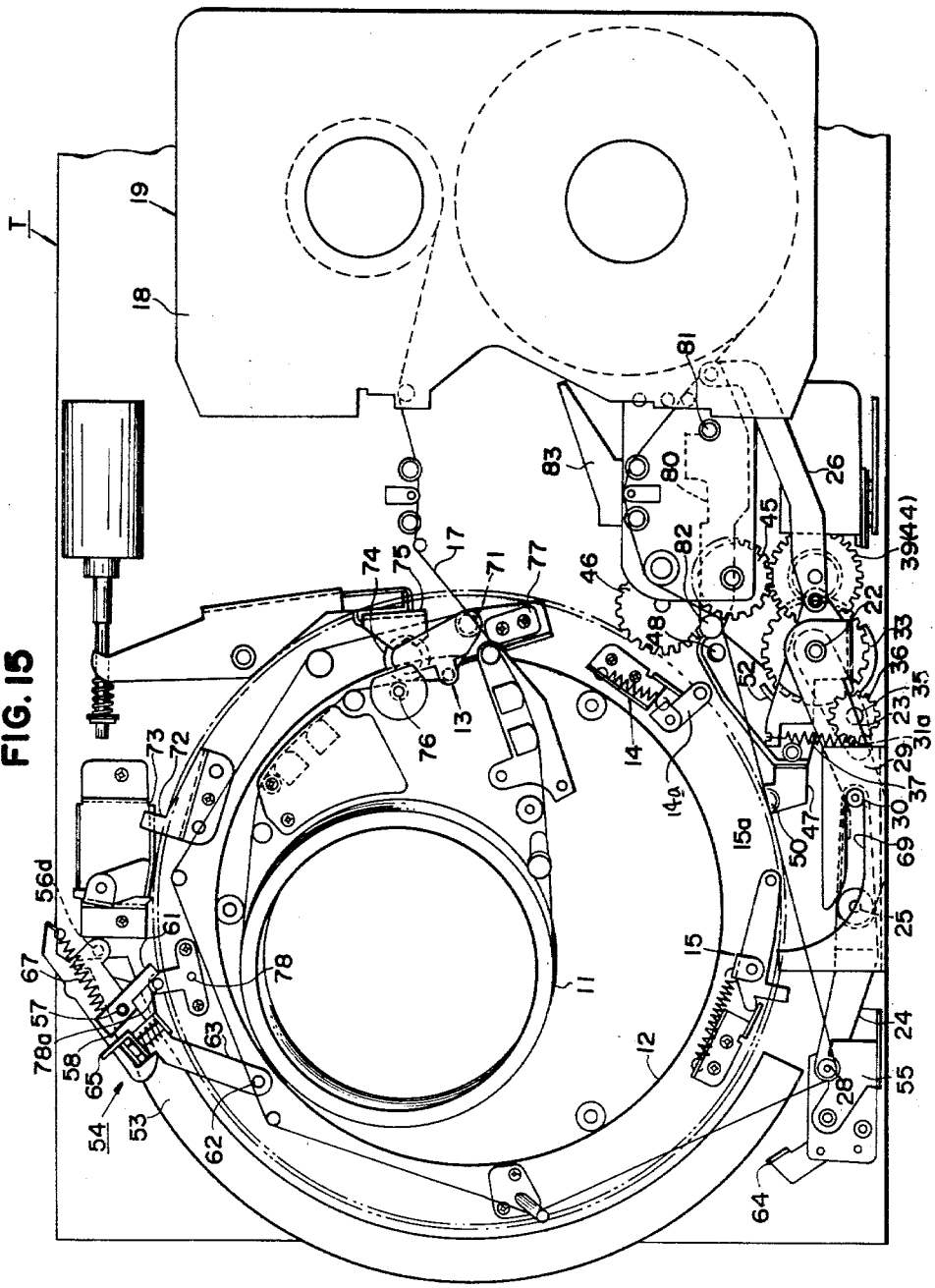

MAGNETIC TAPE LOADING APPARATUS

BACKGROUND OF THE INVENTION

1. Field of the Invention

This invention relates generally to magnetic recording and reproducing apparatus, such as, video tape recording and reproducing apparatus (VTR), and more particularly, is directed to an improved automatic tape loading and unloading device for such apparatus.

2. Description of the Prior Art

Existing video tape recording and reproducing apparatus generally comprise a tape guide drum having a rotary magnetic head assembly associated therewith to record or reproduce video signals on a magnetic tape which is usually wound on supply and take-up reels with the tape beneath such reels being wrapped about a portion of the circumferential surface of the drum and being driven by a cooperating capstan and pinch roller and by suitable rotation of the take-up reel. In preparing such a video tape recording and reproducing apparatus for operation, the tape extending between the supply and take-up reels, which are preferably contained in a cassette, must be wrapped about at least a portion of the drum circumference so that the tape will be guided thereby with respect to the rotary magnetic head assembly.

One type of previously proposed automatic tape loading and unloading device for wrapping the tape extending between the supply and take-up reels about a portion of the circumferential surface of the drum is disclosed in detail in U.S. Pat. No. 3,821,805, issued June 28, 1974, having a common assignee herewith and includes a rotatable support member, in the form of a ring, extending around the guide drum in a plane that is inclined with respect thereto. The support ring includes a tape engaging member, such as a guide pin, extending from a rotatable arm supported by the support ring, the guide pin projecting upwardly from the support ring so as to extend into an opening of the cassette for engagement with the tape therein when the ring is an inactive or starting positon. The tape engaging member or pin draws a loop of tape from the cassette and wraps one side of the tape loop around the guide drum upon rotation of the ring to an operative position during a tape loading operation.

However, the guide drum and support ring are both inclined at different angles with respect to the cassette holder. Thus, the tape engaging member or guide pin secured to the support ring is also inclined with respect to the cassette holder and the tape positioned therein. As a result of such inclination of the guide pin, the tape engaged thereby tends to shift upwardly towards the free end of the guide pin, that is, in the widthwise direction of the tape, during the loading operation of the tape on the tape guide drum. This is particularly applicable when the guide pin is comprised of a rotatable roller which is provided for smooth loading of the tape about the guide drum. Conventionally, a guide pin flange has been provided at the upper or free end of the guide pin for retaining the tape on the guide pin during the loading operation. However, since the tape has a tendency to shift upwardly on the guide pin, the tape is often bunched or creased against the flange, causing possible damage to the tape or to any recording made therein during operation of the magnetic recording and/or reproducing apparatus.

OBJECTS AND SUMMARY OF THE INVENTION

Accordingly, it is an object of this invention to provide an automatic tape loading and unloading device for a magnetic recording and/or reproducing apparatus that avoids the above-described difficulties encountered with the prior art.

More particularly, it is an object of this invention to provide an automatic tape loading and unloading device for a magnetic recording and/or reproducing apparatus which employs a magnetic tape contained in a cassette or cartridge.

Another object of this invention is to provide an automatic tape loading and unloading device which automatically and smoothly wraps a magnetic tape about a tape guide drum in a helical scan magnetic recording and/or reproducing apparatus without bunching or creasing the tape.

Still another object of this invention is to provide an automatic tape loading and unloading device having a rotatable support ring extending about a guide drum and first and second tape guide assemblies actuable by the support ring for successively wrapping a magnetic tape about first and second circumferential portions of the tape guide drum.

In accordance with an aspect of this invention, an automatic tape loading and unloading device is provided for use in a magnetic recording and/or reroducing apparatus of the type having a cylidrical tape guide drum with at least one rotary magnetic head which moves in a circular path substantially coinciding with the outer circumferential surface of the drum, and a cassette holder spaced from the guide drum for receiving a cassette or cartridge containing a magnetic tape, for example, wound about and extending between supply and take-up reels in the cassette or cartridge. The tape loading and unloading device includes a support member, such as a rotatable support ring, extending around the guide drum and being rotatable in a plane that is inclined with respect to a plane passing through the tape in the cassette or cartridge. The device further includes a first tape guiding assembly actuable by the support ring for helically wrapping a loop of the tape about a first portion of the circumferential surface of the tape guide drum, for example, along a first half of eventually covered surface of the tape guide drum, and a second tape guiding assembly also actuable by the support ring for successively wrapping the aforesaid loop of the tape a contiguous second portion of the circumferential surface of the tape guide drum so as to complete the loading of the magnetic tape to its operative position.

In a preferred embodiment, the first tape guiding assembly includes a first tape engaging member which rides on an arcuate guide rail extending around the guide drum along the first portion of the circumferential surface of the drum. The first tape guiding assembly is caused to ride along the arcuate guide rail by an engaging pin on the rotatable support ring as the latter rotates about the guide drum. The second tape guiding assembly includes a second tape engaging member disposed on the rotatable support ring for engaging the tape after the first tape engaging member has completed its movement along the arcuate guide rail. The second tape engaging assembly thus engages the tape during the remaining rotation of the support ring for wrapping the tape about a second contiguous portion of the circumferential surface of the tape guide drum.

The above, and other, objects, features and advantages of the invention, will be apparent in the following detailed description of an illustrative embodiment of the invention which iis to be read in connection with the accompanying drawings.

BRIEF DESCRIPTION OF THE DRAWINGS

FIG. 8 is a side elevational view of the first tape guiding assembly of FIG. 6 in its operative position in which the positional relationship between the first tape guiding assembly, the tape guide drum and the support ring is shown;

FIG. 10 is a side elevational view of the first tape guiding assembly of FIG. 6 in its inoperative position;

FIG. 12 is a top plan view of the tape loading and unloading device of FIG. 3, illustrating the actuation of the first tape guiding assembly by the support ring;

FIG. 15 is a top plan view of the tape loading and unloading device of FIG. 3 upon completion of the tape loading operation.

DETAILED DESCRIPTION OF A PREFERRED EMBODIMENT

Figure 1:
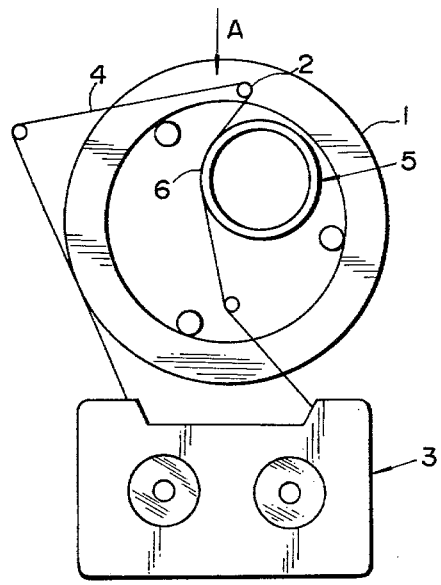
FIG. 1 is a schematic top plan view of a magnetic recording and/or reproducing apparatus provided with a tape loading and unloading device according to the prior art.

Referring to the drawings in detail, and initially to FIG. 1 thereof, it will be seen that, in the prior art magnetic recording and/or reproducing apparatus there illustrated, a tape cassette 3 is provided which includes supply and take-up reels rotatably contained within cassette 3 and having a magnetic tape 4 wound thereon. A loop of magnetic tape 4 is drawn out from cassette 3 and helically wrapped about at least a portion of the outer circumferential surface 6 of a cylindrical tape guide drum 5 having a circumferential slot or gap (not shown) and having one or more rotary magnetic heads (not shown) which are moved along the slot or gap, that is, in a circular path substantially coinciding with the outer circumferential surface of tape guide drum 5. A mechanism for wrapping tape 4 about guide drum 5 includes an annular support member 1, such as a support ring, which is rotatably supported for rotation about guide drum 5 in a circular or arcuate path and is eccentrically positioned with respect thereto. An upstanding tape guiding pin 2 is mounted on the upper surface of support ring 1 through, for example, a pivotal arm (not shown), for withdrawing tape 4 from tape cassette 3 and helically wrapping the tape about the outer circumferential surface 6 of tape guide drum 5 as support ring 1 rotates in the clockwise direction as viewed in FIG. 1.

Figure 2:
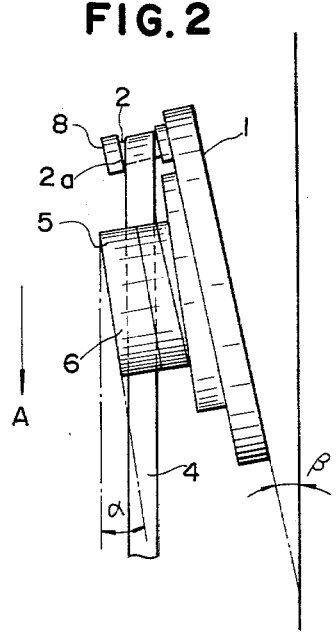
FIG. 2 is a side elevational view of a portion of the apparatus of FIG. 1.

In such prior art apparatus, in order for tape 4 to be helically wrapped about outer circumferential surface 6, guide drum 5 is inclined with respect to cassette 3 (in the direction of arrow A) at a slant angle $\alpha$, as shown in FIG. 2. Support ring 1 is also inclined with respect to cassette 3 (in the direction of arrow A) by a different slant angle $\beta$. It should be appreciated that the inclination of support ring 1 with respect to cassette 3 results in tape guiding pin 2 also being inclined with respect to tape cassette 3 and, more particularly, with the longitudinal direction along tape 4, as withdrawn from tape cassette 3. Consequently, during the loading operation, when tape guiding pin 2 rotates with support ring 1 so as to wrap the tape about guide drum 5, tape 4 has a tendency to move or shift toward the free end of tape guiding 2, that is, in the widthwise direction of tape 4. This is particularly applicable when tape guiding pin 2 is comprised of a rotatable roller 2a, the latter being utilized for smooth loading of the tape about guide drum 5. In other words, as roller 2a rotates about its own axis and also rotates with support ring 1, the tape tends to shift toward the free end of roller 2a. In the case where a flange 8 is provided at the free or upper end of tape guiding pin 2 (FIG. 2), the shifting movement of tape 4 results in the tape bunching or being creased, causing possible damage to the tape and/or to any recording made thereon.

Figure 3:
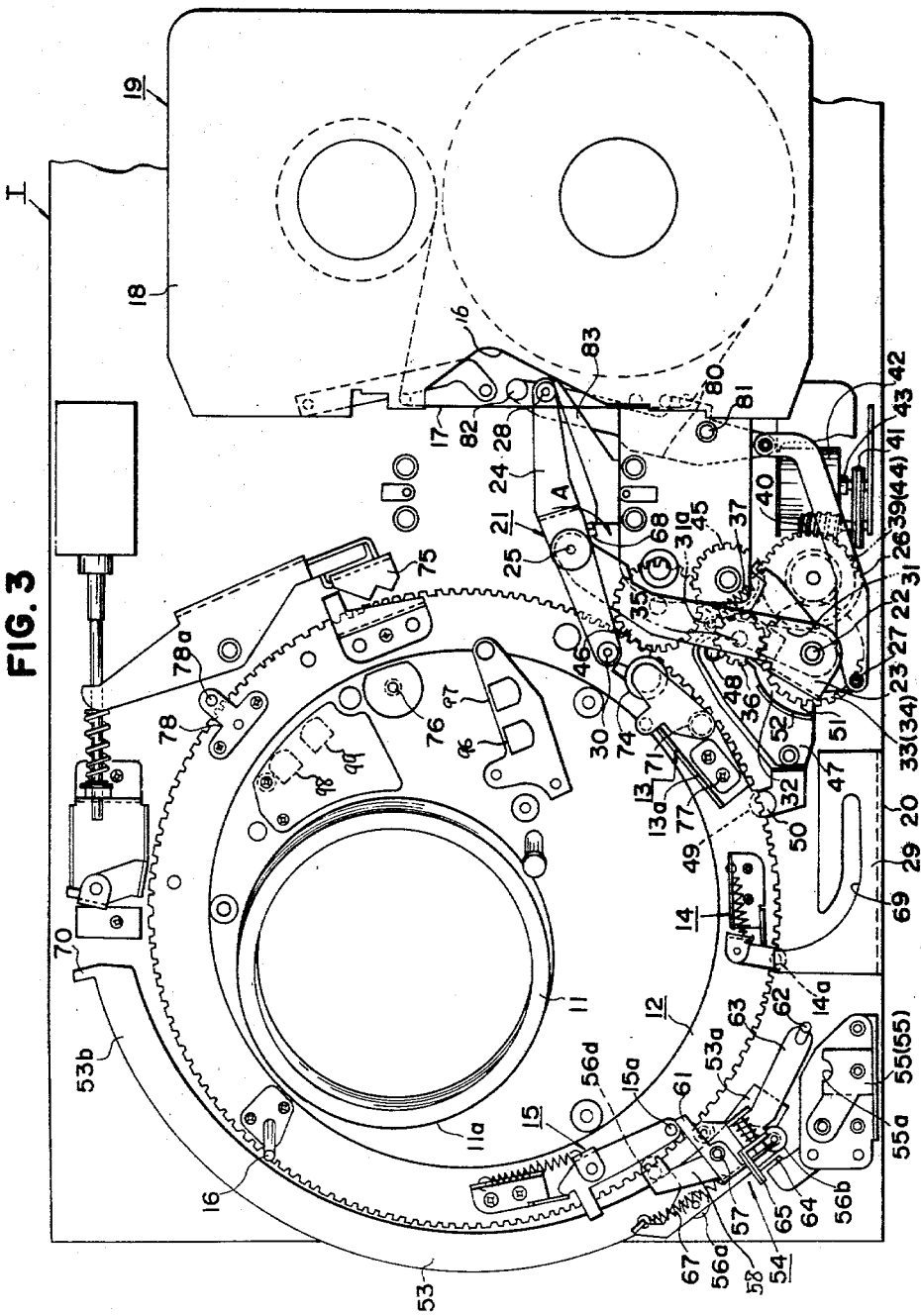
FIG. 3 is a schematic top plan view of an automatic tape loading and unloading device according to this invention for use in a magnetic recording and/or reproducing apparatus, in which the automatic tape loading and unloading device is in its inoperative position.
Figure 4:
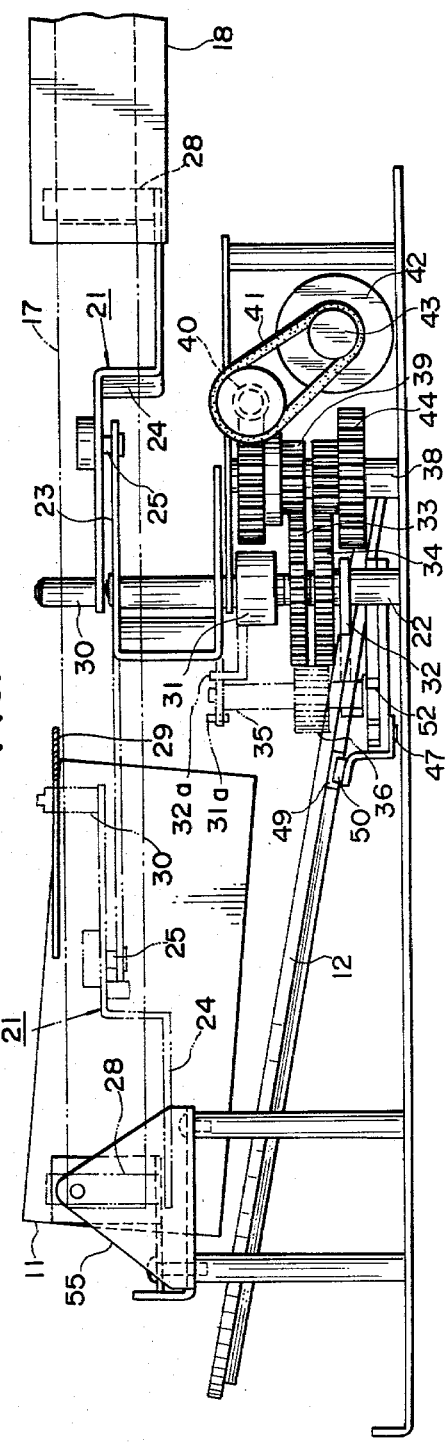
FIG. 4 is a side elevational view of the automatic tape loading and unloading device of FIG. 3.
Figure 5:
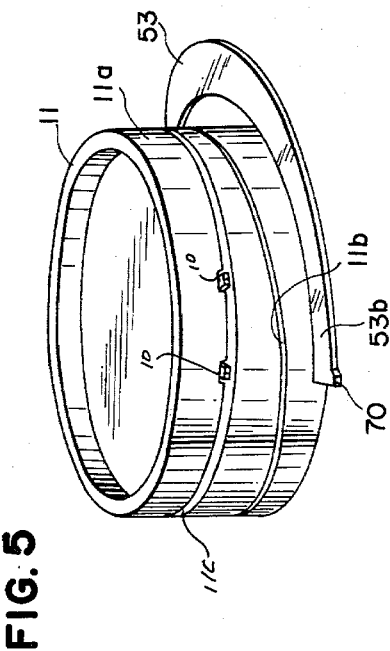
FIG. 5 is a perspective view illustrating the positional relationship between the tape guide drum and the arcuate guide rail in the tape loading and unloading device of FIG. 3.

Referring now to FIGS. 3-5, one embodiment of an automatic tape loading and unloading device according to this invention for use with a magnetic recording and/or reproducing apparatus will now be described. As shown therein, a cylindrical tape guide drum 11 is suitably mounted along the back portion of a chassis T and has a circumferential slot or gap 11e (FIG. 5) along which one or more rotary magnetic heads 10 are moved, that is, in a circular path substantially coinciding with the outer circumferential surface of guide drum 11, to scan a magnetic tape when the latter is wrapped about a predetermined extent of the periphery of guide drum 11. A cassette holder indicated generally by the reference numeral 19 is suitably mounted on chassis T in front of guide drum 11 and is adapted to receive a tape cassette 18 and to operatively position the latter for a recording or reproducing operation. Tape cassette 18 is shown to include a supply reel and a take-up reel rotatably contained therein and having a magnetic tape 17 wound thereon. It should be appreciated that guide drum 11 is inclined with respect to cassette 18 and tape 17 contained therein (FIG. 4) in much the same manner as was previously described in regard to the prior art of FIGS. 1 and 2 so that tape 17 can be helically wrapped about the outer circumferential surface of guide drum 11.

The tape loading and unloading device according to this invention is shown to include an annular support member 12, preferably in the form of a support ring, which is rotatably supported for rotation about guide drum 11 in a circular or arcuate path that extends under guide drum 1. Support ring 12 is shown to be inclined with respect to guide drum 11 and is positioned eccentrically with respect thereto to provide a relatively large space for accommodating a drive capstan 76 and fixed magnetic heads 96–99 which may, for example, be used for recording and/or reproducing audio and control signals and for erasing any previously recorded signals from the tape.

The tape loading and unloading device according to this invention is further shown to include a tape drawing mechanism for withdrawing the tape 17 extending between the supply and tape-up reels of tape cassette 18 to a predetermined position when the latter is received and positioned within tape cassette holder 19. The tape drawing mechanism is comprised of a pivoted arm assembly 21 having a first pivot arm 23 pivoted at one end on chassis T by means of a fixed shaft 22 and a second tape engaging arm 24 pivotally mounted at the free end of pivot arm 23 by a pin 25. Tape engaging arm 24 is provided at one end thereof with an upstanding tape guiding pin 28 adapted to project upwardly into a recess 16 of tape cassette 18 so as to be located behind tape 17, and being operative to withdraw the tape to a predetermined end position adjacent guide drum 11. At the opposite end of tape engaging arm 24, an upstanding link pin 30 is provided, the function of which will hereinafter be described in greater detail.

Figure 11:
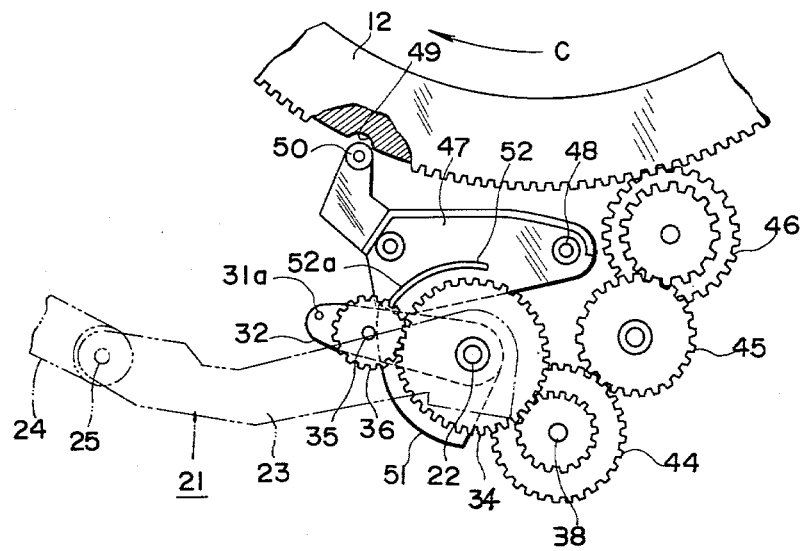
FIG. 11 is an enlarged top plan view of a portion of the tape drawing mechanism of the tape loading and unloading device of FIG. 3 illustrating the positional relationship thereof at the start of rotation of the support ring.

Pivoted arm assembly 21 is adapted to be driven in the counterclockwise directon, as viewed in FIG. 3, by a drive mechanism for withdrawing tape 17 from tape cassette 18 to its predetermined end position. In particular, the drive mechanism includes first and second plates 31 and 32 rotatably secured to shaft 22 and first and second sun gears 33 and 34 also rotatably secured to shaft 22 and disposed between first and second plates 31 and 32. A connecting rod 35 connects first plate 31 to second plate 32 and has a planet gear 36 rotatably secured thereto in meshing relation with both sun gears 33 and 34. Further, a tension spring 37 (FIG. 3) is connected between a pin 31a (FIG. 4) of first plate 31 and pivot arm 23 of pivoted arm assembly 21. The tape drawing mechanism further includes a stepped worm gear 39 rotatably mounted on a second shaft 38 fixed to chassis T, and worm gear 39, in turn, meshes with a worm 40 which is rotated by means of a drive belt 41 connected to a rotary shaft 43 of a drive motor 42. Second sun gear 34 meshes with a stepped gear 44 also rotatably mounted on second shaft 38 and which, in turn, is connected in meshing relation to support ring 12 through first and second driven gears 45 and 46, as shown in FIGS. 3 and 11.

The tape drawing mechanism for withdrawing tape 17 from tape cassette 18 to its predetermined end position adjacent guide drum 11 further includes a cam lever 47 pivotally mounted on a shaft 48 secured to chassis T with cam lever 47 being positioned between support ring 12 and shaft 22. A positioning roller 50 is secured to the free end of cam lever 47 and is adapted to mate with a corresponding notch or recess 49 formed at a predetermined position along the outer periphery of support ring 12. Cam lever 47 further includes an arcuate pressure plate 52 adapted to mate with a corresponding arcuate segmental cam 51 formed on second plate 32. It should be appreciated, as shown in FIG. 3, that when segmental cam 51 mates with arcuate pressure plate 52, positioning roller 50 is urged within notch 49 of support ring 12 for preventing the latter from rotating. Lastly, the drive mechanism for arm assembly 21 includes a fixed guide plate 29 secured to a side wall 20 of the recording and/or reproducing apparatus and having an arcuate slot 69 therein.

In operation, tape guiding pin 28 of pivoted arm assembly 21 is first positioned in recess 16 formed in tape cassette 18 so as to be positioned behind a run of tape 17 extending between the supply and take-up reels. Rotary shaft 43 is then rotated by drive motor 42 in a first loading direction so as to transmit a rotational driving force to worm gear 39 through drive belt 41 and worm 40. This results in first sun gear 33 being rotated in the clockwise direction as viewed in FIG. 3. At this time, however, segmental cam 51 of second plate 32 is positioned in mating relation with pressure plate 52 of cam lever 47. This results in positioning roller 50 being urged within notch 49 to prevent rotation of support ring 12. It should therefore be appreciated that second sun gear 34 is thereby also prevented from rotating as the result of its meshing relationship with support ring 12 through gears 44–46. Thus, since planet gear 36 meshes with both sun gears 33 and 34, the rotation of sun gear 33 alone causes planet gear 36 to rotate counterclockwise thereabout, as viewed in FIG. 3., thereby also rotating first and second plates 31 and 32 about shaft 22 through connecting rod 35. Consequently, tension spring 37 causes the rotation of first plate 31 in the counterclockwise direction, as viewed in FIG. 3, to effect swinging of pivot arm 23 and tape engaging arm 24 in the counterclockwise direction about shaft 22. This, of course, results in tape guiding pin 28 moving in an arcuate path in the counterclockwise direction, as viewed in FIG. 3, thereby tape 17 is automatically withdrawn from tape cassette 18 to its predetermined end position.

Figure 9:
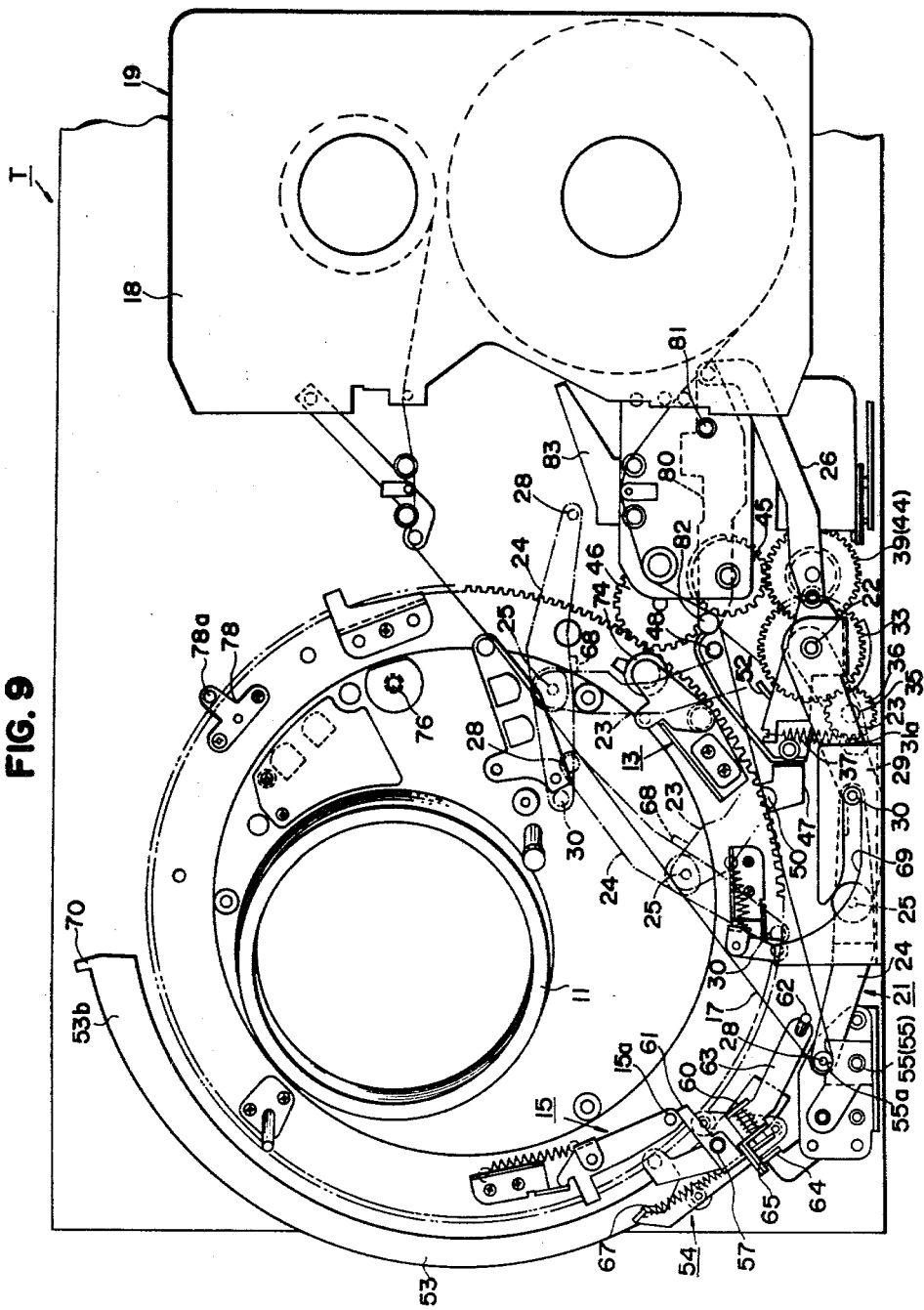
FIG. 9 is a top plan view of the automatic tape loading and unloading device of FIG. 3 in which a loop of tape has been withdrawn from the cassette housing.

It should be appreciated that while pivot arm 23 is rotated about shaft 22, tape engaging arm 24 rotates slightly about pin 25 in the direction of arrow A (FIG. 3) due to the tensioning force of tape 17 between the supply and take-up reels during the withdrawing operation. Accordingly, an engaging lug or stop 68 is provided on tape engaging arm 24 adjacent pivot pin 25 which abuts against a side edge of pivot arm 23 to prevent tape engaging arm 24 from rotating past a position where tape engaging arm 24 and pivot arm 23 are in orthogonal relation. This orthogonal relation is, of course, maintained throughout much of the continued rotation of pivoted arm assembly 21. Pivoted arm assembly 21 continues to rotate in the counterclockwise direction, as shown by the dot-dash action lines in FIG. 9, while continuing to withdraw tape 17 from tape cassette 18. As pivoted arm assembly 21 approaches its predetermined end position, link pin 30 of tape engaging arm 24 enters arcuate slot 69 of fixed guide plate 29, as shown in FIG. 9, and rides within slot 69 toward shaft 22 until restrained from further movement by the end of slot 69. At this time, the continued rotation of pivoted arm assembly 21 causes tape engaging arm 24 to jack-knife or rotate in the counterclockwise direction, as viewed in FIG. 3, in relation to pivot arm 23 until tape guiding pin 28 is restrained from further movement by respective grooved portions 55a of first and second guide plates 55 secured to chassis T of the recording and/or reproducing apparatus. This, of course, prevents pivoted arm assembly 21 from further rotating so as to position tape 17 at its predetermined end position. Further, when the tape has reached this final position, second plate 32 has rotated to a position whereby segmental cam 51 thereof no longer mates with arcuate pressure plate 52 so that positioning roller 50 is no longer urged within notch 49 of support ring 12. It should therefore be appreciated that support ring 12 is no longer restrained from rotating about guide drum 11.

In addition, a first connecting link 26 is pivotally mounted on first plate 31 near the periphery thereof so that as this latter plate rotates in the counterclockwise direction, as viewed in FIGS. 3 and 9, connecting link 26 moves towards cassette 18. A second connecting link 80 is pivoted at one end thereof to the free end of first connecting link 26 and is further pivoted to chassis T at an intermediate point thereon by a pivot pin 81. A tape tensioning pin 82 is secured to the free end of second connecting link 80. Thus, as first and second connecting links 26 and 80 move from their positions in FIG. 3 to their respective positions in FIG. 9, tape tensioning pin 82 is rotated counterclockwise about pivot pin 81 so as to contact tape 17 withdrawn from cassette 18 and provide a tensioning force to remove any slack therefrom.

Referring back to FIG. 3, the automatic tape loading and unloading device according to this invention is further shown to include a first tape guiding assembly 54 actuable by support ring 12 for wrapping a portion of the withdrawn tape 17 about a first portion of the outer circumferential surface 11a of guide drum 11. A substantially flat and arcuate cam plate or guide rail 53 is provided for supporting first tape guiding assembly 54 in sliding relation on the upper surface thereof. Guide rail 53, as shown in FIGS. 5 and 8, is inclined with respect to guide drum 11, although remains substantially parallel to the longitudinal direction of tape 17 from tape cassette 18. In particular, guide rail 53 is displaced from an inclined lower tape edge guide 11b on the outer cylindrical surface 11a of guide drum 11 by a constant height H (FIG. 8). It should therefore be appreciated that when first tape guiding assembly 54 rides along the upper surface of guide rail 53, tape 17 is wrapped about the outer cylindrical surface 11a of guide drum 11 with the lower edge 17a thereof being in alignment with inclined tape edge guide 11b on guide drum 11.

Figure 6:
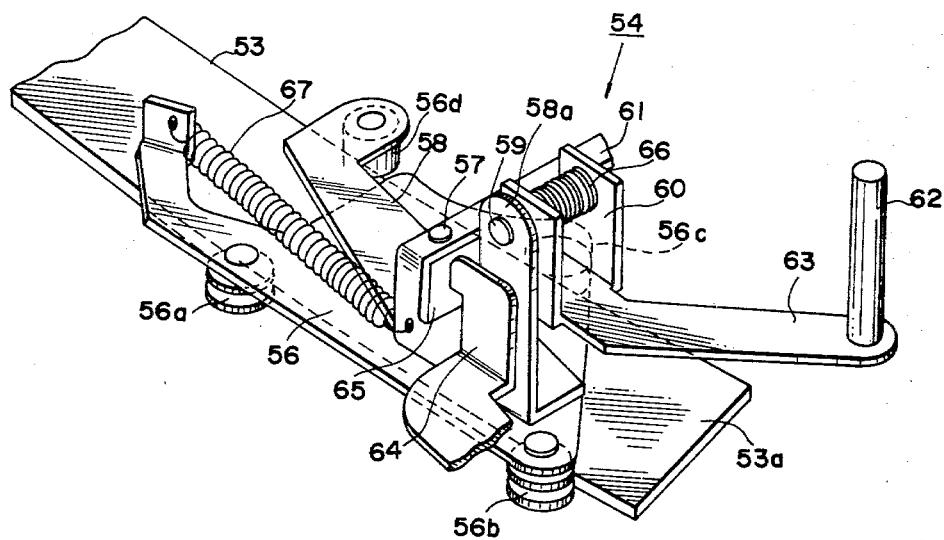
FIG. 6 is an enlarged perspective view of the first tape guiding assembly of the tape loading and unloading device of FIG. 3.
Figure 7:
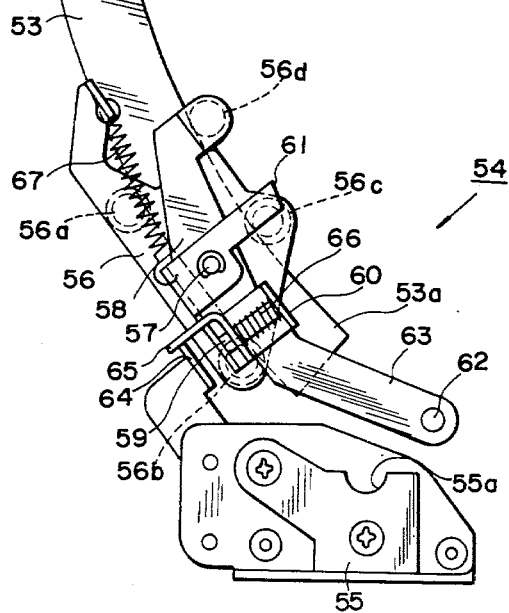
FIG. 7 is an enlarged top plan view of the first tape guiding assembly of FIG. 6.

Referring to FIGS. 6 and 7, there are shown enlarged views of first tape guiding assembly 54 which will now be described. First tape guiding assembly 54 includes a movable plate 56 on the lower surface of which are rotatably mounted three rollers 56a, 56b and 56c positioned against the side edges of guide rail 53 and adapted to ride therealong. A pivotal plate 58 is mounted, by means of a pivot pin 57 extending through an upstanding bracket portion thereof, on movable plate 56 and is spring-biased in the clockwise direction, as viewed in FIG. 7, about pivot pin 57 by a tension spring 67 connected between the upstanding bracket portion and movable plate 56. Pivotal plate 58 carries a guide pin 56d secured to a free end thereof and which is adapted to ride against the inner edge of guide rail 53, and the upstanding bracket portion of plate 58 includes a guide lever 61 extending radially inward toward support ring 12. Further, a U-shaped bracket 60 is pivotally mounted by a pivot pin 59 on an upstanding bracket 58a fixed to pivotal plate 58. Bracket 60 includes an extension arm 63 having a free end at which an upstanding tape engaging pin 62 is fixed. It should be appreciated that, as a result of the pivotal movement of bracket 60, tape engaging pin 62 can be positioned in a lower inoperative position, as shown in FIG. 10, or a raised operative position where it is engageable with tape 17, as shown in FIG. 8. Further, pivot pin 59 is positioned at a height substantially corresponding to the widthwise center or median of tape 17, as represented by line a in FIG. 8, when the tape is in the operatively positioned cassette, and the midway point along tape engaging pin 62 lies substantially in the same horizontal plane as pivot pin 59 and line a. Thus, since tape engaging pin 62, in its operative position, as viewed in FIG. 8, is substantially perpendicular to the upper surface of guide rail 53 and since guide rail 53 runs substantially parallel with the longitudinal direction of tape 17, tape 17 does not shift upwardly on tape engaging pin 62 when this latter pin engages tape 17 for wrapping it about the outer circumferential surface of guide drum 11.

Referring back to FIGS. 6 and 7, it will be seen that first tape guiding assembly 54 further includes an engaging member 65 in the form of a flat plate fixed to bracket 60 at the pivoted end thereof for coacting with an upstanding extension 64 fixed to guide plate 55 so as to position tape engaging pin 62 in its lowered inoperative position (FIG. 10) or its raised operative position (FIG. 8), as will be hereinafter described in greater detail. Accordingly, after tape 17 is withdrawn to its predetermined end position (FIG. 9) by pivoted arm assembly 21, first tape guiding assembly 54 becomes operative to continue to withdraw tape 17 from tape cassette 18 and wrap the same about the outer circumferential surface of guide drum 11. In particular, as first and second plates 31 and 32 continue to rotate in the counterclockwise direction, as viewed in FIG. 3, segmental cam 51 of second plate 32 no longer mates with arcuate pressure plate 52 of cam lever 47. In other words, immediately after pivoted arm assembly 21 is prevented from further rotation, segmental cam 51 rotates past arcuate pressure plate 52 of cam lever 47, as shown in FIG. 11. Consequently, support ring 12 is no longer restrained and is caused to rotate in the clockwise direction, as indicated by arrow C in FIG. 11, by the gear train comprised of second sun gear 34, gear 44 and driven gears 45 and 46. This results in positioning roller 50 of cam lever 47 being forced out from recess 49 by the rotation of support ring 12 whereby cam lever 47 is rotated slightly in the counterclockwise direction, as viewed in FIG. 11. As a result, an edge of arcuate pressure plate 52 is positoned at the side of segmental cam 51 so as to fix pivot arm 23 of pivoted arm assembly 21 in the position shown in full lines on FIG. 9.

As shown in FIGS. 3 and 9, support ring 12 has a restraining mechanism 15 mounted thereon and including a restraining arm 15a extending tangentially on support ring 12 in the counterclockwise direction, as viewed in FIG. 3. Just prior to rotation of support ring 12, restraining arm 15a is at a position whereby it contacts guide lever 61 so as to urge pivotable plate 58 in the clockwise direction, as viewed in FIG. 3. After support ring 12 begins rotating in the clockwise direction, as viewed in FIG. 9, restraining arm 15a no longer engages guide lever 61 of first tape guiding assembly 54. As support ring 12 continues to rotate, a guide arm 14a of a transmission guide 14 (FIG. 3) secured to the upper surface of support ring 12 engages guide lever 61 whereby pivotal plate 58 is rotated in the counterclockwise direction, as shown on FIG. 12, until guide pin 56d thereof abuts and rides against the inner surface of guide rail 53, as on FIG. 7. Continued rotation of support ring 12 results in guide arm 14a forcing first tape guiding assembly 54 along guide rail 53. As assembly 54 rides along guide rail 53, engaging member 65 thereof is no longer restrained by upstanding extension 64 so that tape engaging pin 62 is moved by coil spring 66 to its raised operative position (FIG. 8) so as to engage tape 17 withdrawn from cassette 18. Thus, tape 17 is effectively transferred from tape guiding pin 28 to tape engaging pin 62. Continued rotation of support ring 12 results in first tape guiding assembly 54 riding along guide rail 53 from an initiation end 53a thereof to a termination end 53b thereof whereby tape 17 is wound about a first portion of the outer circumferential surface 11a of guide drum 11 to a position shown in FIGS. 13 and 14. It should be appreciated that, since guide rail 53 and, consequently, tape engaging pin 62, run along respective planes parallel to a plane in the longitudinal direction of tape 17, tape 17 does not shift upwardly toward the free end of tape engaging pin 62 as in the prior art apparatus. Thus, tape 17 is wrapped smoothly in a helical manner about tape guide drum 11 until the tape reaches point B (FIG. 13) on guide drum 11 corresponding to the point at which circumferential slot 11e begins to slope downwardly towards cassette holder 19. In other words, point B lies on the diametrical axis 11d which passes through the central axis 11c of guide drum 11 in the plane of inclination of the latter.

Figure 14:
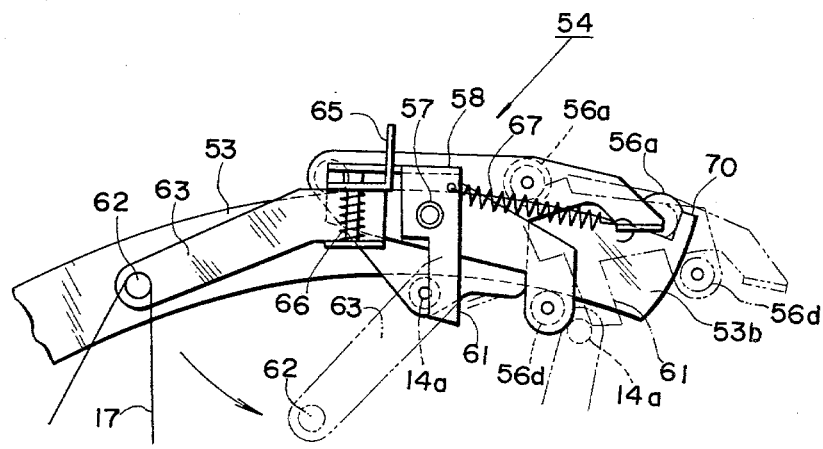
FIG. 14 is an enlarged top plan view of the first tape guiding assembly at its position shown in FIG. 13.
Figure 13:
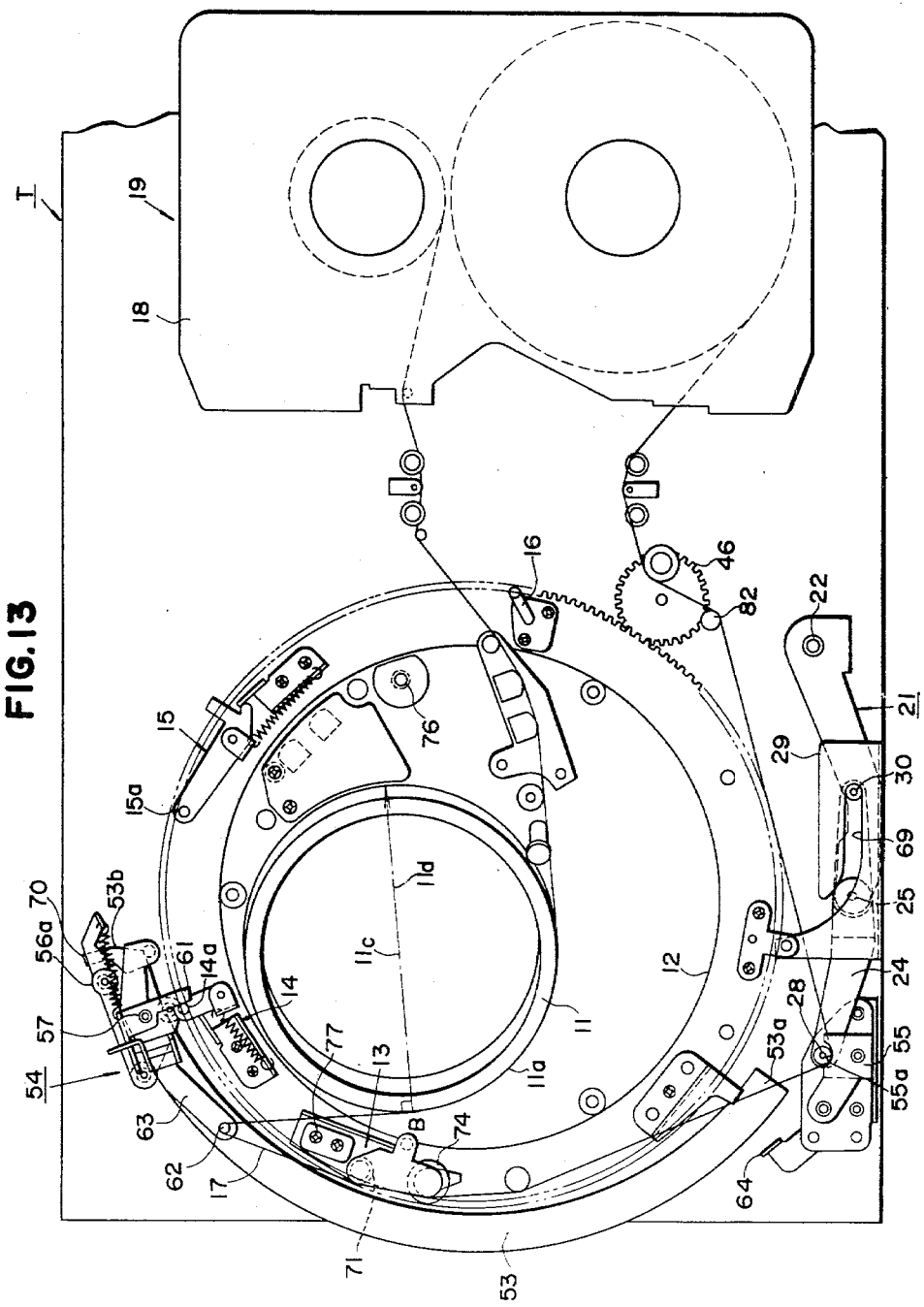
FIG. 13 is a top plan view of the tape loading and unloading device of FIG. 3, illustrating the final position of the first tape guiding assembly.

When first tape guiding assembly 54 has wrapped tape 17 about the first portion of the outer circumferential surface 11a of guide drum 11, roller 56a of first tape guiding assembly 54 engages an outwardly directed radial flange 70 at the terminal end 53b of guide rail 53, as shown on FIGS. 13 and 14, to prevent further movement of first tape guiding assembly 54 along guide rail 53. At this point, roller 56d projects past the terminal end 53b of guide rail 53. Thus, as support ring 12 continues rotating in the clockwise direction, guide arm 14a, which is still in contact with guide lever 61, causes pivotal plate 58 to rotate about pivot pin 57 against the tensioning force of spring 67, as shown by the dot-dash lines in FIG. 14. Upon continued rotation of support ring 12, guide arm 14a moves past guide lever 61, resulting in tension spring 67 returning pivotal plate 58 to its initial position. At this point, however, tape 17 is still engaged by tape engaging pin 62 of first tape guiding assembly 54.

Referring back to FIG. 3, the automatic tape loading and unloading device according to this invention is further shown to include a second tape guiding assembly 13 mounted on the upper surface of support ring 12 past transmission guide 14 in the counterclockwise direction thereon. As shown therein, second tape guiding assembly 13 includes a base plate 13a pivotally mounted on support ring 12 by a pivot pin 77. A tape engaging pin 71 and a pinch roller 74 are mounted on plate 13a and project upwardly therefrom. Thus, as support ring 12 continues rotating, tape 17 is transferred from first tape guiding assembly 54 to tape engaging pin 71 of second tape guiding assembly 13 whereby tape 17 is further wrapped about a second portion of the outer circumferential surface 11a of guide drum 11 which is contiguous with the aforementioned first portion of the outer circumferential surface. Support ring 12 continues to rotate until a restraining member 72 thereon engages a corresponding extension 73 secured to chassis T of the recording and/or reproducing apparatus for preventing further rotation of support ring 12 (FIG. 15). Further, at the completion of rotation of support ring 12, pinch roller 74 on second tape guiding assembly 13 is urged by a press plate 75 towards capstan 76 secured to chassis T so as to sandwich tape 17 therebetween whereby capstan 76 drives tape 17 about the outer circumferential surface of guide drum 11. Further, at the completion of the loading operation, a bias pin 78a of a press plate 78 secured to the upper surface of support ring 12 contacts guide lever 61 to rotate pivotal plate 58 about pivot pin 57 against the force of tension spring 67, that is, in the counterclockwise direction, as viewed in FIG. 15, to remove any excess tension from tape 17.

Accordingly, at the end of the loading operation, the apparatus is now ready for recording and/or reproducing of signals upon tape 17. It should be appreciated that the loading of tape 17 in two steps, that is, by first and second tape guiding assemblies 54 and 13, results in tape 17 being smoothly loaded about the outer circumferential surface of guide drum 11 without any creasing or bunching of the tape.

During the unloading operation, support ring 12 is driven in the counterclockwise direction, as viewed in FIG. 3, by reverse drive motor 43 through worm 40, worm gear 39, first sun gear 33, planet gear 36, second sun gear 34, stepped gear 44 and first and second driven gears 45 and 46. Since the side edge of segmental cam 51, at this time, abuts against arcuate pressure plate 52, first and second plates 31 and 32 do not rotate so that pivoted arm assembly 21 remains in its predetermined end position, as shown in FIG. 9. Also, at the initiation of the counterclockwise or unloading rotation of support ring 12, the pressure plate 75 removes any pressure from pinch roller 74 so as to disengage pinch roller 74 of second tape guiding assembly 13 from capstan 76. As support ring 12 begins to rotate, bias pin 78a of press plate 78 becomes disengaged from guide lever 61, resulting in pivotal plate 58 rotating in the clockwise direction about pivot pin 57 by the action of spring 67 so as to return to its initial position. Thus, as a result of unloading rotation of support ring 12, tape 17 is unwrapped from guide drum 11, and the take-up reel of tape cassette 18 is suitably rotated to wind the unwrapped tape on the take-up reel.

As support ring 12 continues to rotate in the counterclockwise direction, guide arm 14a, which is pivoted about a pin on transmission guide 14 and is adapted for pivotal movement only in the clockwise direction, as viewed in FIG. 15, contacts guide lever 61 of first tape guiding assembly 54 and rides thereover. Continued rotation of support ring 12 results in restraining arm 15a of restraining mechanism 15 engaging guide lever 61 for forcing first tape guiding assembly 54 along guide rail 53 from terminal end 53b thereof to its initiating end 53a. At initiating end 53a of guide rail 53, engaging member 65 of first tape guiding assembly 54 is forced to ride up and over upstanding extension 64 so as to position tape engaging pin 62 at its lower inoperative position (FIG. 10) for disengaging tape 17.

It should be appreciated that segmental cam 51, although not in mating relation with arcuate pressure plate 52, still engages arcuate pressure plate 52 at its side so as to urge cam lever 47 in the clockwise direction, as viewed in FIG. 9. Thus, as support ring 12 continues to rotate to its position shown in FIG. 3, positioning roller 50 is urged within recess 49 of support ring 12. Consequently, segmental cam 51 is no longer restrained from movement and first and second plates 31 and 32 rotate in the clockwise direction whereby segmental cam 51 mates with arcuate pressure plate 52 to lock roller 50 within recess 49. This results in second sun gear 34 being prevented from rotating so that planet gear 36 rotates thereabout in the clockwise direction, as viewed in FIG. 9, whereby a projecting 32a on first plate 31 abuts against and returns pivoted arm assembly 21 to its original position shown in FIG. 3. Accordingly, tape guiding pin 28 is positioned within recess 16 in tape cassette 18 to permit return of tape 17 to its original position wholly within the cassette housing. In this regard, a guide plate 83 is provided in cassette holder 19 for guiding tape engaging pin 28 to its desired initial position within tape cassette 18.

In addition, first connecting link 26, pivotally mounted on first plate 31 near the periphery thereof, is rotated in the clockwise direction, as viewed in FIGS. 3 and 9, towards fixed guide plate 29. Thus, as first connecting link 26 moves from its position in FIG. 9 to that in FIG. 3, tape tensioning pin 82, mounted on second connecting link 80, is rotated clockwise about pivot pin 81 from its tape tensioning position to a position adjacent tape guiding pin 28, as shown in FIG. 3. After tape guiding pin 28 and tape tensioning pin 82 have reached their predetermined initial positions in recess 16 formed in tape cassette 18, a detecting means, for example, a micro-switch (not shown), may be used to detect the completion of the unloading operation to halt further operation of motor 42.

It should be appreciated that the above automatic tape loading and unloading device according to this invention avoids the difficulties encountered with the prior art. For example, the tape is first guided about a first outer circumferential portion of guide drum 11 to an intersecting point B on the outer circumferential surface thereof by a first tape guiding assembly. Thereafter, the tape is transferred to a second tape guiding assembly and guided about a second contiguous outer circumferential portion of guide drum 11 so that the tape is prevented from being damaged or creased by a roller or flange of a tape guide pin as in the prior art. In other words, each of the first and second tape guiding assemblies 54 and 13 is oriented and moved, particularly when engaged with the tape, so as to avoid any creasing or bending of the tape.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a magnetic recording and/or reproducing apparatus of the type having a cylindrical tape guide drum with at least one rotary magnetic head adapted to move in a circular path substantially coinciding with the outer circumferential surface of said drum, and holder means spaced from said guide drum for receiving tape supply means containing a magnetic tape, tape loading and unloading means comprising
a support member extending around said guide drum and being rotatable in a plane that is inclined with respect to a plane passing through said tape in said tape supply means;
first tape guiding means movable in a plane which is inclined relative to said plane of rotation of said support member and being actuable by said support member for wrapping a portion of said tape about a first portion of the outer circumferential surface of said tape guide drum; and
second tape guiding means actuable by said support member and acting on said tape following the wrapping thereof about said first portion of the outer circumferential surface for further wrapping said portion of said tape about a contiguous second portion of the outer circumferential surface of said tape guide drum.

2. An apparatus according to claim 1; in which said support member is in the form of a ring rotatable about its center which is eccentrically located with respect to the axis of said guide drum in the direction toward said tape supply means so as to provide a relatively large clearance between said ring and said guide drum at the side of the latter facing toward said tape supply means.

3. An apparatus according to claim 2; further comprising at least one fixed magnetic head spaced from said guide drum within said clearance and being engaged by said tape when said tape is wrapped about at least a portion of the outer circumferential surface of said guide drum.

4. An apparatus according to claim 1; further comprising tape drawing means for withdrawing a loop of said tape from said tape supply means to a predetermined position.

5. An apparatus according to claim 4; further comprising a chassis, and in which said tape drawing means includes arm means pivoted at one end on said chassis and a tape guiding member extending from the other end of said arm means for withdrawing said loop of tape from said tape supply means to said predetermined position.

6. In a magnetic recording and/or reproducing apparatus of the type having a chassis, a cylindrical tape guide drum with at least one rotary magnetic head adapted to move in a circular path substantially coinciding with the outer circumferential surface of said drum, and holder means spaced from said guide drum for receiving tape supply means containing a magnetic tape, tape loading and unloading means comprising
a support member extending around said guide drum and being rotatable in a plane that is inclined with respect to a plane passing through said tape in said tape supply means;
first tape guiding means actuable by said support member for wrapping a portion of said tape about a first portion of the outer circumferential surface of said tape guide drum;
second tape guiding means actuable by said support member for successively wrapping said portion of said tape about a contiguous second portion of the outer circumferential surface of said tape guide drum; and
tape drawing means including arm means having a first pivotal arm pivoted at one end on said chassis and a second tape engaging arm pivoted at an intermediate point thereon at the other end of said first pivotal arm, and a tape guiding member extending from one end of said second tape engaging arm for withdrawing a loop of said tape from said tape supply means to a predetermined position.

7. An apparatus according to claim 6; in which said tape drawing means further includes drive means for rotating said arm means so as to withdraw said loop of tape from said tape supply means to said predetermined position, said drive means including planetary gear means having at least one sun gear and a planet gear adapted to rotate about said at least one sun gear, and spring means for rotating said arm means in response to rotation of said planet gear about said at least one sun gear.

8. An apparatus according to claim 7; in which said planetary gear means includes a shaft secured to said chassis and two sun gears mounted on said shaft in meshing relation with said planet gear; and said drive means further includes cam lever means for preventing rotation of one of said sun gears and said support member whereby rotation of the other of said sun gears causes said planet gear to rotate thereabout, and plate means for mounting said planet gear about said shaft in meshing relation with said two sun gears.

9. An apparatus according to claim 8; in which said spring means includes a tension spring connected between said plate means and said first pivotal arm of said arm means whereby rotation of said planet gear about said other of said sun gears results in said tension spring rotating said arm means so as to withdraw said loop of tape from said tape supply means to said predetermined position.

10. An apparatus according to claim 9; in which said arm means further includes a link pin mounted at the other end of said second tape engaging arm, and said tape drawing means further includes a guide plate having an arcuate slot therein in which said link pin rides during rotation of said arm means to cause said second tape engaging arm to rotate relative to said first pivotal arm so as to position said tape at said predetermined position.

11. In a magnetic recording and/or reproducing apparatus of the type having a cylindrical tape guide drum with at least one rotary magnetic head adapted to move in a circular path substantially coinciding with the outer circumferential surface of said drum, and holder means spaced from said guide drum for receiving tape supply means containing a magnetic tape, tape loading and unloading means comprising a support member extending around said guide drum and being rotatable in a plane that is inclined with respect to a plane passing through said tape in said tape supply means;

first tape guiding means actuable by said support member for wrapping a portion of said tape about a first portion of the outer circumferential surface of said tape guide drum;

second tape guiding means actuable by said support member for successively wrapping said portion of said tape about a contiguous second portion of the outer circumferential surface of said tape guide drum; and an arcuate guide rail positioned about said first portion of the outer circumferential surface of said guide drum and on which said first tape guiding means is adapted to ride for wrapping said portion of said tape about said first portion of the outer circumferential surface of said tape guide drum.

12. An apparatus according to claim 11; in which said first tape guiding means includes movable plate means adapted to ride along said guide rail, pivotal plate means pivotally mounted on said movable plate means, and tape engaging means pivotally mounted on said pivotal plate means for engaging said portion of said tape as said movable plate means rides along said guide rail.

13. An apparatus according to claim 12; in which said tape engaging means includes a tape engaging pin adapted to be moved between a lower inoperative position below said tape and a raised operative position for engaging said tape as said movable plate means rides along said guide rail, spring means for urging said tape engaging pin to said raised operative position, and an engaging member for urging said tape engaging pin to said lower inoperative position when said tape engaging means is inoperative.

14. An apparatus according to claim 13; in which said pivotal plate means includes guide lever means extending radially inward toward said support member, and said support member has guide arm means secured thereto for contacting said guide lever means as said support member is rotated about said guide drum, whereby said first tape guide means rides along said guide rail to wrap said portion of said tape about said first portion of the outer circumferential surface of said guide drum.

15. An apparatus according to claim 1; in which said second tape guiding means includes a tape engaging pin secured to said support member for engaging said portion of said tape during completion of operation of said first tape guiding means and upon continued rotation of said support member whereby said portion of said tape is wrapped about said contiguous second portion of the outer circumferential surface of said tape guide drum.

16. An apparatus according to claim 1; in which said tape guide drum has a tape edge guide formed on said outer circumferential surface in a plane which is inclined in respect to the plane of said circular path of the head and being engageable by an edge of the tape wrapped about said circumferential surface, and said plane in which the first tape guiding means is movable is approximately parallel with said plane of the tape edge guide.

* * * * *